(12) United States Patent
Dohi et al.

(10) Patent No.: US 11,314,075 B2
(45) Date of Patent: Apr. 26, 2022

(54) IMAGE PROCESSING DEVICE, MICROSCOPE SYSTEM, IMAGE PROCESSING METHOD, AND IMAGE PROCESSING PROGRAM

(71) Applicant: OLYMPUS CORPORATION, Tokyo (JP)

(72) Inventors: Masahito Dohi, Tokyo (JP); Motohiro Shibata, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 9 days.

(21) Appl. No.: 16/988,828

(22) Filed: Aug. 10, 2020

(65) Prior Publication Data
US 2020/0371337 A1 Nov. 26, 2020

Related U.S. Application Data

(63) Continuation of application No. PCT/JP2019/005355, filed on Feb. 14, 2019.

(30) Foreign Application Priority Data

Feb. 16, 2018 (JP) .............................. JP2018-025763

(51) Int. Cl.
*G06T 5/00* (2006.01)
*G02B 21/36* (2006.01)
(Continued)

(52) U.S. Cl.
CPC ............ *G02B 21/365* (2013.01); *G06T 5/002* (2013.01); *G06T 5/006* (2013.01); *G06T 5/40* (2013.01);
(Continued)

(58) Field of Classification Search
CPC .......... G06T 5/002; G06T 5/006; G06T 5/40; G06T 5/50; G06T 5/005; G06T 5/20;
(Continued)

(56) References Cited

U.S. PATENT DOCUMENTS 5,715,326 A * 2/1998 Ortyn ................. G06K 9/00127
356/39
5,757,022 A * 5/1998 Kobayashi .............. G06T 5/009
250/583

(Continued)

FOREIGN PATENT DOCUMENTS

JP 2000-113173 A 4/2000
JP 2007-336563 A 12/2007
(Continued)

OTHER PUBLICATIONS

International Search Report dated May 14, 2019 issued in PCT/JP2019/005355.
(Continued)

*Primary Examiner* — Jose L Couso
(74) *Attorney, Agent, or Firm* — Scully, Scott, Murphy & Presser, P.C.

(57) ABSTRACT

An image processing device is configured to: generate a histogram of pixel values of a plurality of pixels contained in an image; set a background pixel value by using a peak value of the generated histogram; set a noise range with respect to the set background pixel value; and replace the pixel values that fall in the set noise range with a single arbitrary pixel value.

18 Claims, 9 Drawing Sheets

(51) Int. Cl.
*G06T 5/40* (2006.01)
*G06T 5/50* (2006.01)

(52) U.S. Cl.
CPC ...... *G06T 5/50* (2013.01); *G06T 2207/10056* (2013.01); *G06T 2207/20076* (2013.01); *G06T 2207/20224* (2013.01)

(58) Field of Classification Search
CPC . G06T 5/009; G06T 5/008; G06T 7/11; G06T 7/194; G06T 7/90; G06T 7/001; G06T 7/40; G06T 7/10; G06T 7/136; G06T 7/0012; G06T 7/97; G06T 2207/10056; G06T 2207/20076; G06T 2207/20224; G06T 2207/20152; G06T 2207/30176; G06T 2207/10024; G06T 2207/10061; G06T 2207/20004; G06T 2207/20008; G06T 2207/20012; G06T 2207/30004; G06T 2207/10008; G06T 2207/10116; G06T 2207/20208; G06T 2207/30024; G06T 2210/41; G06T 2200/28; G02B 21/365; G02B 21/36; G06K 9/342; G06K 9/4652; G06K 9/00234; G06K 9/4647; G06K 9/6289; G06K 9/38; G06K 9/40; G06K 9/00463; G06K 9/00127; G06K 9/46; G06K 9/6201; G06K 15/1878; G06K 15/189; G06K 15/1892; G06K 2209/015; G06K 2009/4666; H04N 1/46; H04N 1/644; H04N 1/58; H04N 1/62; H04N 1/40012; H04N 1/403; H04N 1/4072; H04N 5/147; H04N 5/20; H04N 5/235; H04N 5/2355; A61B 5/7207; A61B 8/463; A61B 8/469; G06V 10/28; G06V 10/267; G06V 10/56; G06V 10/50; G06V 10/758; G06V 10/507; G06V 10/803; G06V 10/467; G06V 10/40; G06V 10/75; G06V 20/38; G06V 20/40; G06V 20/69; G06V 30/414; G06V 30/146; G06V 30/189; G06V 30/18086; G06V 30/18095; G06V 30/19073; G06V 40/162

See application file for complete search history.

(56) References Cited

U.S. PATENT DOCUMENTS

| | | | | |
|---|---|---|---|---|
| 5,768,412 A | * | 6/1998 | Mitsuyama | G06K 9/00127 382/133 |
| 5,978,497 A | * | 11/1999 | Lee | G01N 15/1475 382/133 |
| 7,689,050 B2 | * | 3/2010 | Sakaue | H04N 1/4072 382/239 |
| 8,625,921 B1 | * | 1/2014 | Kokemohr | G06K 9/6201 382/260 |
| 2002/0037103 A1 | * | 3/2002 | Hong | G06T 7/11 382/173 |
| 2003/0053692 A1 | * | 3/2003 | Hong | H04N 19/23 382/171 |
| 2004/0071363 A1 | * | 4/2004 | Kouri | G06K 9/00516 382/276 |
| 2007/0041027 A1 | * | 2/2007 | Malik | H04N 1/58 358/1.9 |
| 2007/0291120 A1 | | 12/2007 | Campbell et al. | |
| 2008/0181497 A1 | * | 7/2008 | Ferman | G06T 7/136 382/172 |
| 2014/0270459 A1 | * | 9/2014 | Moll | G01N 21/6428 382/134 |
| 2017/0161545 A1 | * | 6/2017 | Champlin | G06K 9/00147 |

FOREIGN PATENT DOCUMENTS

| | | |
|---|---|---|
| JP | 2011-090475 A | 5/2011 |
| JP | 2013-229706 A | 11/2013 |
| WO | 2016/132563 A1 | 8/2016 |

OTHER PUBLICATIONS

Japanese Office Action dated Feb. 4, 2022 received in 2018-025763.

* cited by examiner

IMAGE PROCESSING DEVICE, MICROSCOPE SYSTEM, IMAGE PROCESSING METHOD, AND IMAGE PROCESSING PROGRAM

CROSS-REFERENCE TO RELATED APPLICATIONS

This is a continuation of International Application PCT/JP2019/005355 which is hereby incorporated by reference herein in its entirety.

This application claims the benefit of Japanese Patent Application No. 2018-025763, the content of which is incorporated herein by reference.

TECHNICAL FIELD

The present invention relates to an image processing device, a microscope system, an image processing method, and an image processing program.

BACKGROUND ART

There is a well-known image processing method for processing acquired image data, determining whether or not pixels of interest are pixels of a background color region candidate, excluding a region adjacent to a picture pattern region from the pixels of the background color region candidate, determining whether or not the pixels of interest belong to the background region, and replacing, with a certain background color pixel value, the pixel values of the pixels of interest determined to belong to the background region (refer to, for example, PTL 1).

CITATION LIST

Patent Literature

PTL 1

Japanese Unexamined Patent Application, Publication No. 2011-90475

SUMMARY OF INVENTION

One aspect of the present invention is an image processing device that is configured to: generate a histogram of pixel values of a plurality of pixels contained in an image; set a background pixel value by using a peak value of the generated histogram; set a noise range with respect to the set background pixel value; and replace the pixel values that fall in the set noise range with a single arbitrary pixel value.

Another aspect of the present invention is an image processing device that includes a circuitry configured to: generate a histogram of pixel values of a plurality of pixels contained in an image; set a background pixel value by using a peak value of the generated histogram; set a noise range with respect to the set background pixel value; and replace the pixel values that fall in the set noise range with a single arbitrary pixel value.

Still another aspect of the present invention is a non-transitory computer-readable medium having an image processing program stored therein, the program causing a computer to execute functions of: generating a histogram of pixel values of a plurality of pixels contained in an image; setting a background pixel value by using a peak value of the generated histogram; setting a noise range with respect to the set background pixel value; and replacing the pixel values that fall in the set noise range with a single arbitrary pixel value.

DESCRIPTION OF EMBODIMENTS

An image processing device 3 and a microscope system 1 according to one embodiment of the present invention will now be described with reference to the drawings.

Figure 1:
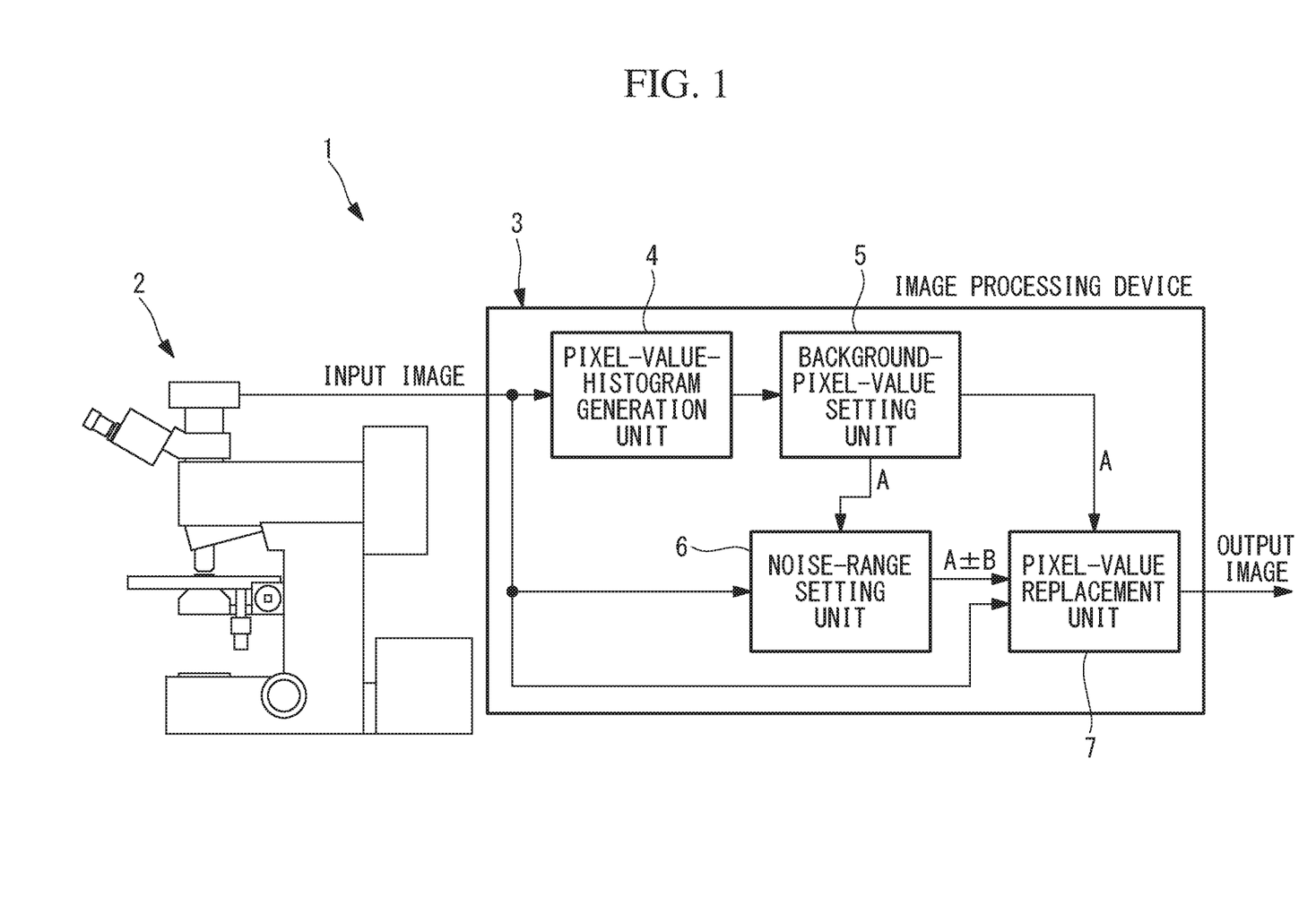
FIG. 1 is an overall configuration diagram showing a microscope system according to one embodiment of the present invention.

As shown in FIG. 1, the microscope system 1 according to this embodiment includes: a microscope main body 2; and the image processing device 3 according to this embodiment.

The image processing device 3 is a device for processing an image (input image) acquired by the microscope main body 2 and includes: a pixel-value-histogram generation unit 4 for generating a histogram of the pixel values I of all pixels of the input image; a background-pixel-value setting unit 5 for setting a background pixel value A on the basis of the generated histogram; a noise-range setting unit 6 for setting a noise range B on the basis of the set background pixel value A; and a pixel-value replacement unit 7 that replaces the pixel values I of the pixels in a noise range A±B with the background pixel value A and that outputs an output image.

The image is, for example, an acquired image of a biological sample, such as cells, and is an image acquired by at least one of the observation methods: bright field, dark field, phase difference, differential interference, fluorescence, and Hoffman modulation contrast.

Figure 2:
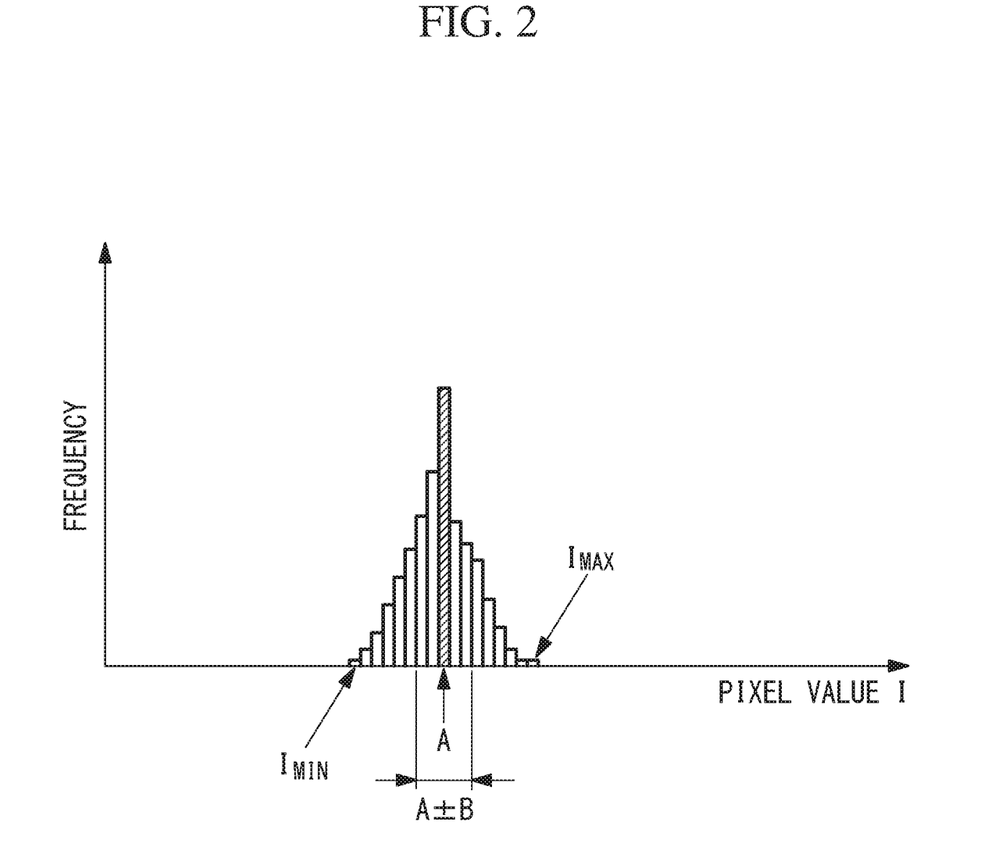
FIG. 2 is a schematic diagram showing one example of a histogram generated by a pixel-value-histogram generation unit of an image processing device provided in the microscope system in FIG. 1.

The pixel-value-histogram generation unit 4 generates a histogram, shown in FIG. 2, whose coordinate axes represent, for example, the pixel value I and the frequency, respectively.

In the histogram in FIG. 2, the background-pixel-value setting unit 5 sets, as the background pixel value A, the pixel value I corresponding to the highest frequency (the peak value of the histogram).

The noise-range setting unit 6 extracts the maximum value IMAX and the minimum value IMIN of the pixel values I in the image, calculates the difference $\Delta I=(IMAX-IMIN)$, and calculates $B=\Delta I \cdot \alpha$ by multiplying the calculated difference $\Delta I$ by a predetermined ratio $\alpha$. The ratio $\alpha$ is, for example, 0.03.

Figure 3:
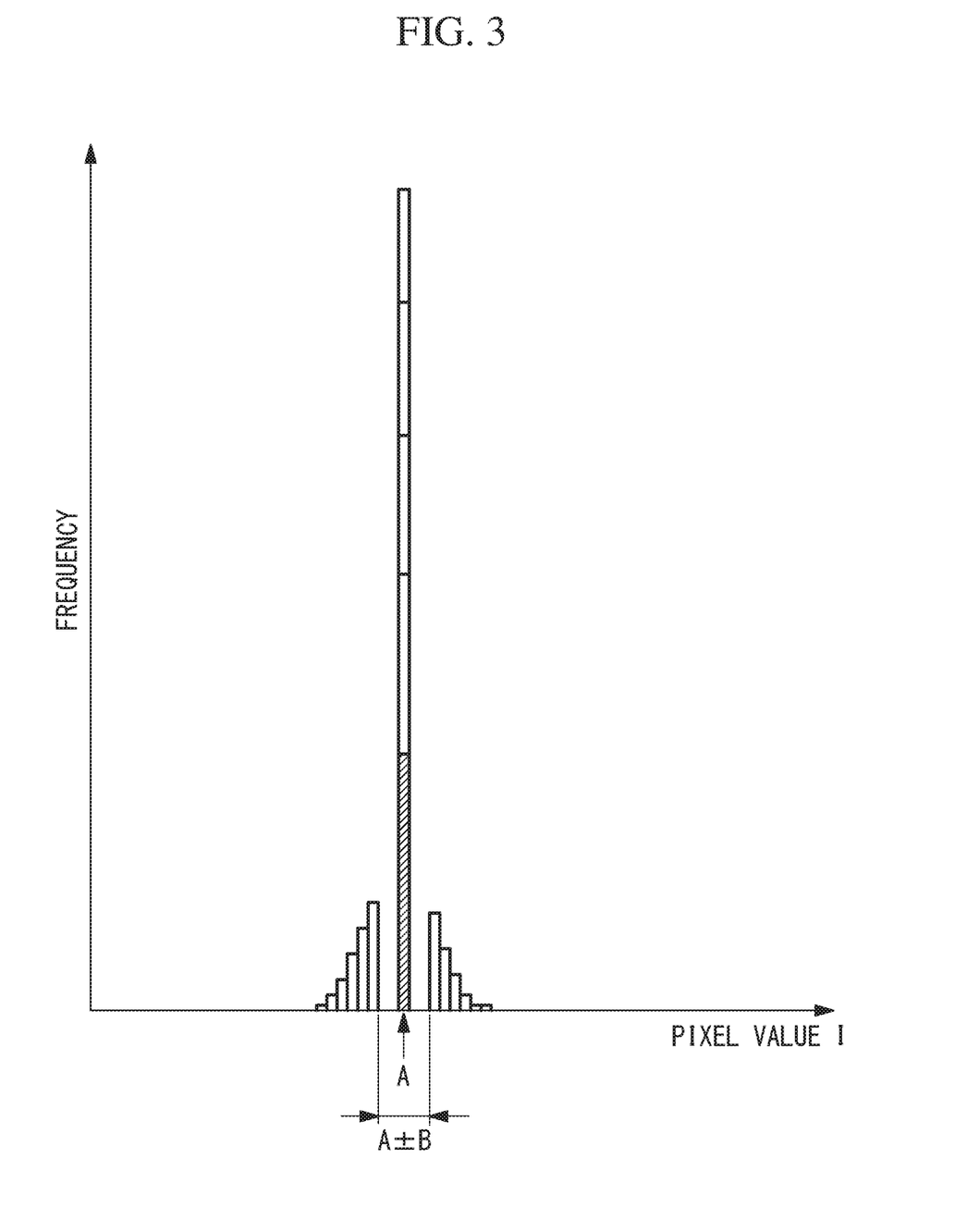
FIG. 3 is a schematic diagram showing a histogram in which the pixel values in a noise range that is determined with respect to a background pixel value in the histogram in FIG. 2 are replaced with the background pixel.

Of the pixel values I of all pixels of the image, all the pixel values I that fall in the noise range $A\pm B$, which has been determined with respect to the background pixel value A set by the background-pixel-value setting unit 5, are replaced with the background pixel value A by the pixel-value replacement unit 7. By doing so, as shown in FIG. 3, an image in which the frequency of the background pixel value A increases whereas the frequencies of the pixel values I in the noise range $A\pm B$ centered on the background pixel value A are zero is generated on the basis of the histogram.

An image processing method using the image processing device 3 according to this embodiment with the above-described structure will be described below.

Figure 4:
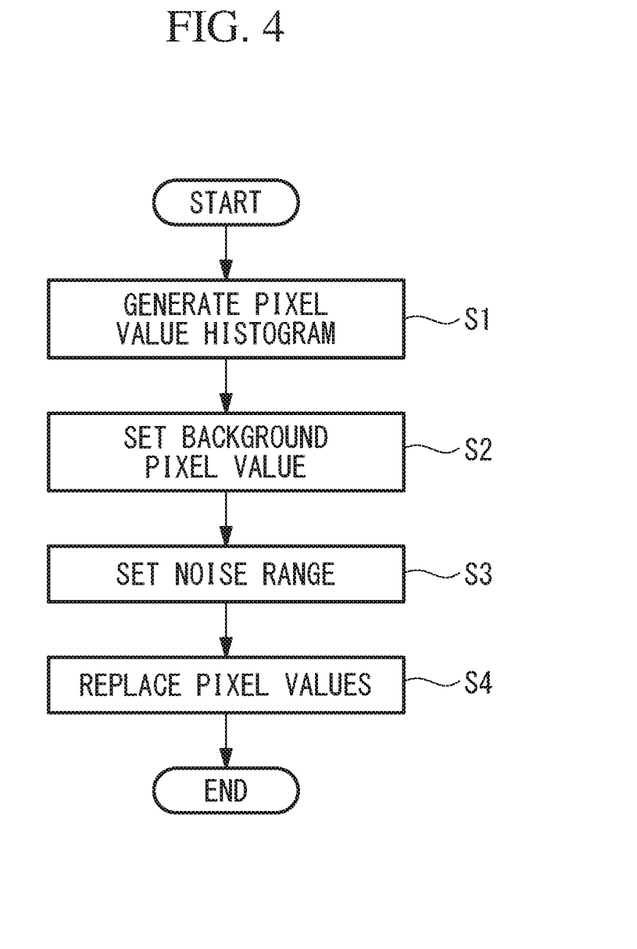
FIG. 4 is a flowchart for illustrating an image processing method according to one embodiment of the present invention, said method being carried out by the image processing device of the microscope system in FIG. 1.

As shown in FIG. 4, in the image processing method according to this embodiment, when an input image acquired by a microscope or the like is input, the pixel-value-histogram generation unit 4 generates a histogram of the pixel values of the input image (pixel-value-histogram generation step S1).

Next, the histogram generated in the pixel-value-histogram generation step S1 is input to the background-pixel-value setting unit 5, and the pixel value I exhibiting the highest frequency is set as the background pixel value A (background-pixel-value setting step S2).

Then, the noise-range setting unit 6 extracts the maximum value IMAX and the minimum value IMIN of the pixel values I in the input image, calculates the difference $\Delta I$, and calculates the noise range B by multiplying the difference $\Delta I$ by the preset ratio $\alpha$ (noise-range setting step S3).

After the noise range B is calculated, the pixel-value replacement unit 7 generates an output image in which, of all pixels in the input image, all the pixel values I that fall in the noise range $A\pm B$, which has been determined with respect to the background pixel value A, are replaced with the background pixel value A (pixel-value replacement step S4).

The pixel values of the substantially monochrome background in the input image acquired by the microscope or the like vary slightly about the background pixel value A. The pixels having the pixel values I close to the background pixel value A account for the largest proportion in the image but are substantially worthless as data for observation.

According to the image processing device 3, the microscope system 1, and the image processing method according to this embodiment, a uniform background color can be achieved, barely without changing the apparent background color in the image, merely by replacing such varying pixel values I in the determined noise range $A\pm B$ with the same background pixel value A. Data in a region in which the same pixel values I are adjacent to one another can be compressed with a high compression rate.

The image processing device 3, the microscope system 1, and the image processing method according to this embodiment afford an advantage in that it is possible to obtain an output image that can be compressed with a high compression rate by processing an image having a background color that slightly varies about the background pixel value A such that the image has a uniform background color determined on the basis of the background pixel value A.

In this case, according to this embodiment, the pixel value exhibiting the highest frequency obtained from the histogram is set as the background pixel value A, eliminating the need to pre-input the background pixel value A, unlike the conventional technique. Therefore, necessary signals are not replaced even when the lighting conditions and the contrast of a specimen are changed. Because, unlike the conventional technique, the pixel value I of a pixel of an edge of the image is not referenced as the background pixel value A, the background pixel value A can be detected with high accuracy. In particular, in the case where the input image is an acquired image of a biological sample, the background pixel value A can be detected with high accuracy even if the biological sample also appears at a corner of the input image or even if the background is cut back as a result of the biological sample growing proliferously over time.

The image processing device 3, the microscope system 1, and the image processing method according to this embodiment also afford an advantage in that processing is fast because, unlike the conventional technique, it is not necessary to determine whether or not the pixel of interest is a pixel belonging to an observation object.

In this embodiment, the noise range B is calculated by using the preset ratio $\alpha$ and the difference $\Delta I$ between the maximum value IMAX and minimum value IMIN of the pixel values I. Instead of this, the noise range B may be set on the basis of noise statistics. For example, in the case where the specifications of the camera used for image acquisition are known, the noise standard deviation $\sigma$ inherent to this camera may be used to set a noise range $A\pm k\sigma$ (e.g., k=3) with respect to the background pixel value A.

Figure 5:
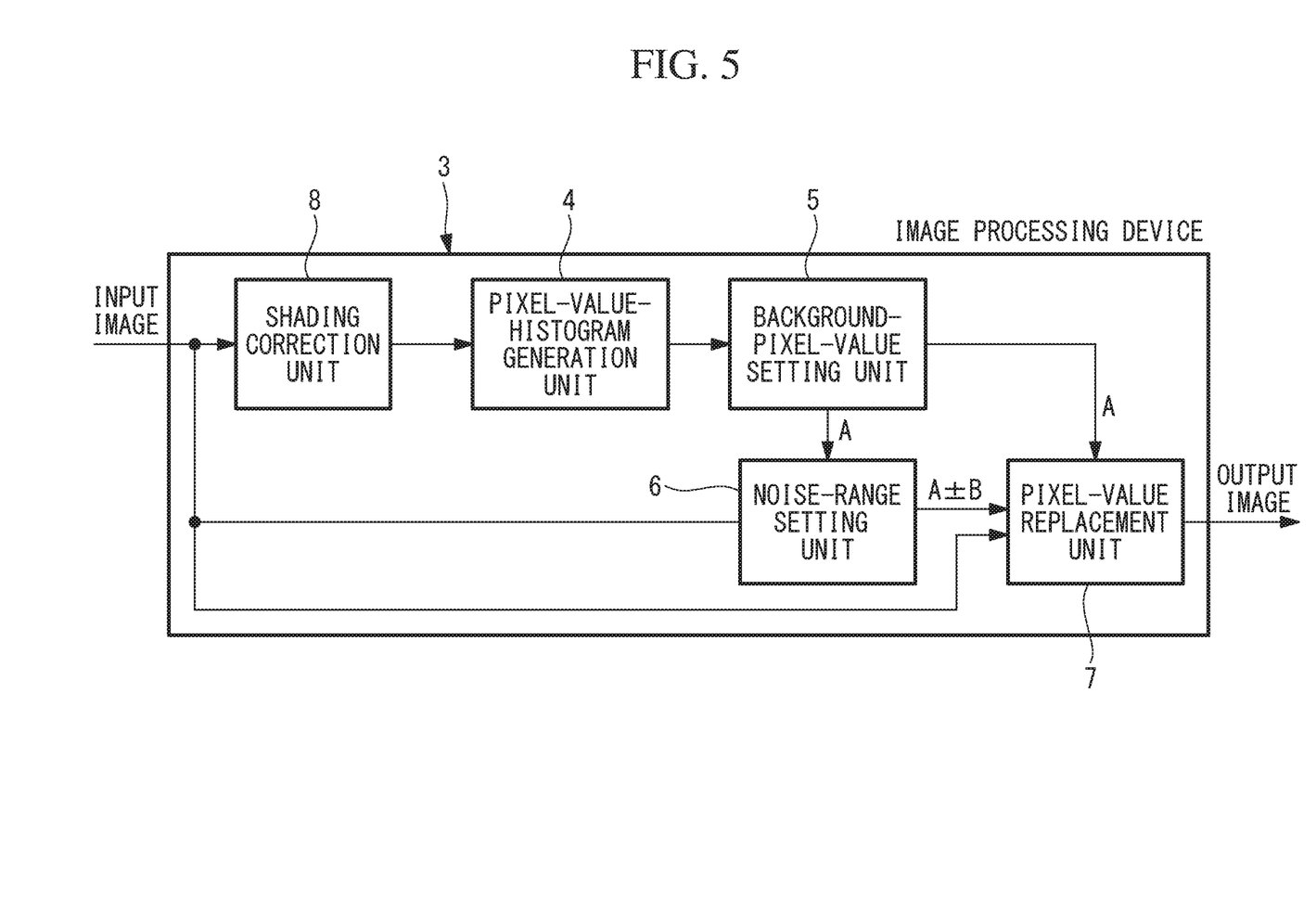
FIG. 5 is a block diagram showing a modification of the image processing device in FIG. 1.

As shown in FIG. 5, this embodiment may further include a shading correction unit 8 for correcting the shading of an input image.

Figure 6:
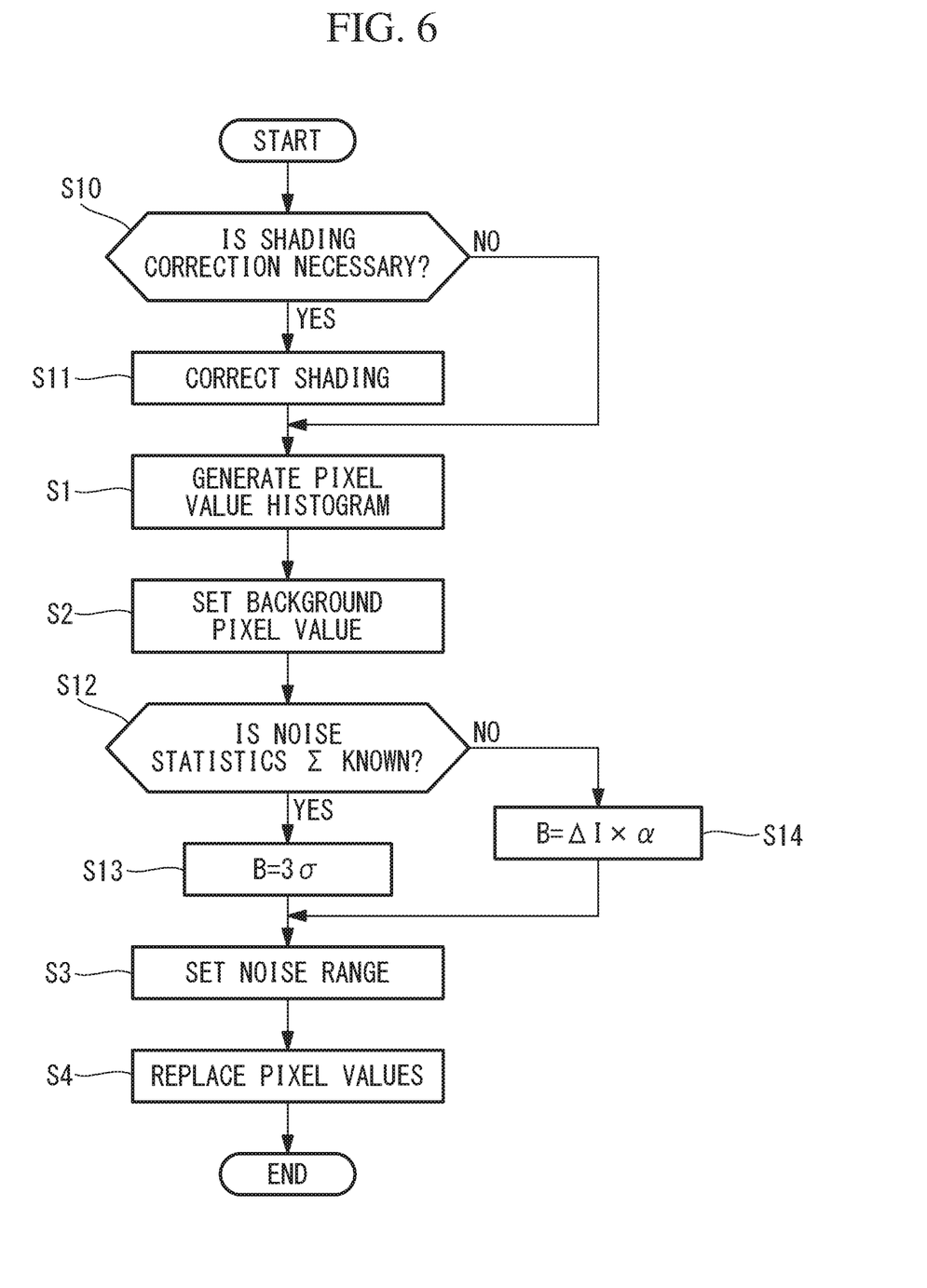
FIG. 6 is a flowchart for illustrating an image processing method that is carried out by the image processing device in FIG. 5.

In this case, as shown in FIG. 6, the shading correction unit 8 determines whether or not the input image needs shading correction (step S10). In the case where it is determined that shading correction is necessary, shading correction is applied to the input image (shading correction step S11). In the case where it is determined that shading correction is not necessary, the input image can be input to the pixel-value-histogram generation unit 4 as is.

Then, the pixel-value-histogram generation unit 4 can generate a histogram of the pixel values I on the basis of the input image that has been sent from the shading correction unit 8, no matter whether the input image has been subjected to shading correction or not.

This affords an advantage in that it is possible to accurately generate a histogram representing an appropriate background pixel value A in the pixel-value-histogram generation step S1, which is carried out only after the input image has been corrected if shading occurs in the input image.

When the noise range B is to be set, it may be determined whether or not noise statistics are known (step S12), as shown in FIG. 6. Then, the noise range B may be calculated on the basis of the noise statistics (step S13) if the noise statistics are known, or the noise range B may be calculated from the difference between the maximum value IMAX and the minimum value IMIN of the pixel values I (step S14) if no noise statistics are known.

When observation is performed by using a plurality of images, such as in the case of tiling in which a plurality of images are acquired while moving the field of view of a camera and then the images are laminated in a shifted manner according to the respective displacements or in the case of time-lapse observation in which a plurality of images acquired at certain intervals are displayed one after another time-sequentially for observation, those images should preferably have the common background pixel value A and noise range B.

In this case, the background pixel value A and the noise range B calculated for any one of the images may be used for all images. Alternatively, the mean values or median values of the background pixel values A and noise ranges B calculated for all images may be used as the common background pixel value A and noise range B. This can achieve easier observation by preventing variations in brightness among the images.

The background pixel value A may be made common among the images either before or after the pixel values in the noise range are replaced with the background pixel value A in each of the images.

In addition, although this embodiment has been described by way of an example of an image of a biological sample acquired with a microscope or the like, the image is not limited to such an example. The present embodiment may be applied to an acquired image of another arbitrary subject.

In addition, FIGS. 2 and 3 show an example where the background pixel value A is the median value of the histogram of the pixel values I. This applies to, for example, the case of phase-contrast observation.

Figure 7:
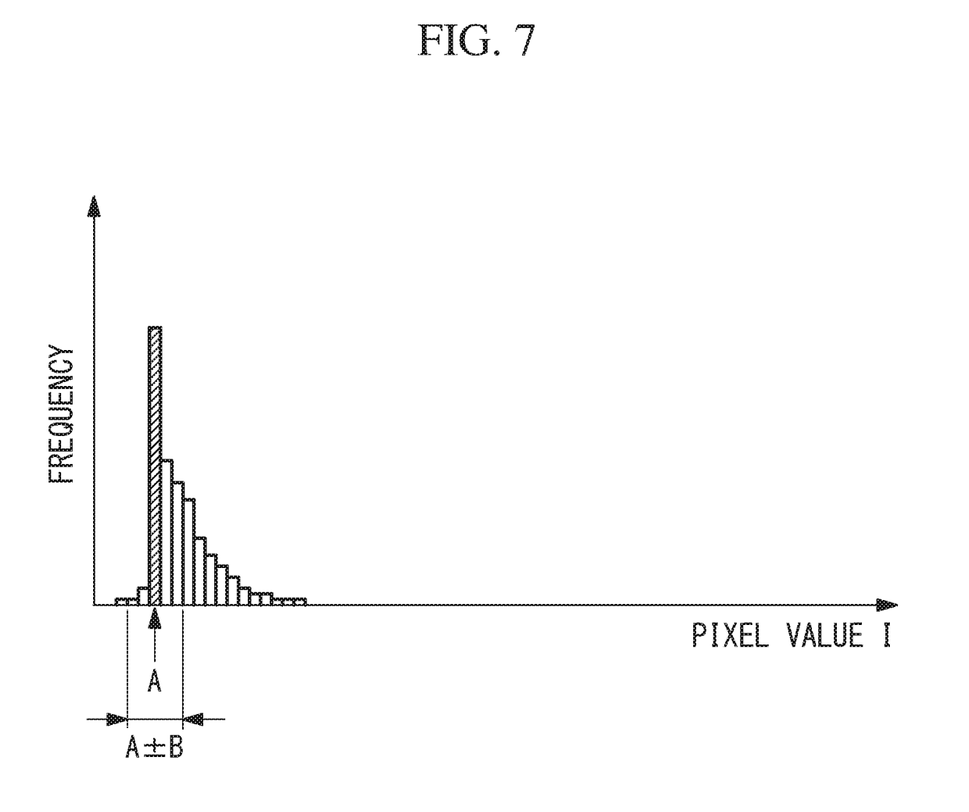
FIG. 7 is a schematic diagram showing one example of a histogram generated by the pixel-value-histogram generation unit of the image processing device in the case where a fluorescent image is acquired by the microscope system in FIG. 1.
Figure 8:
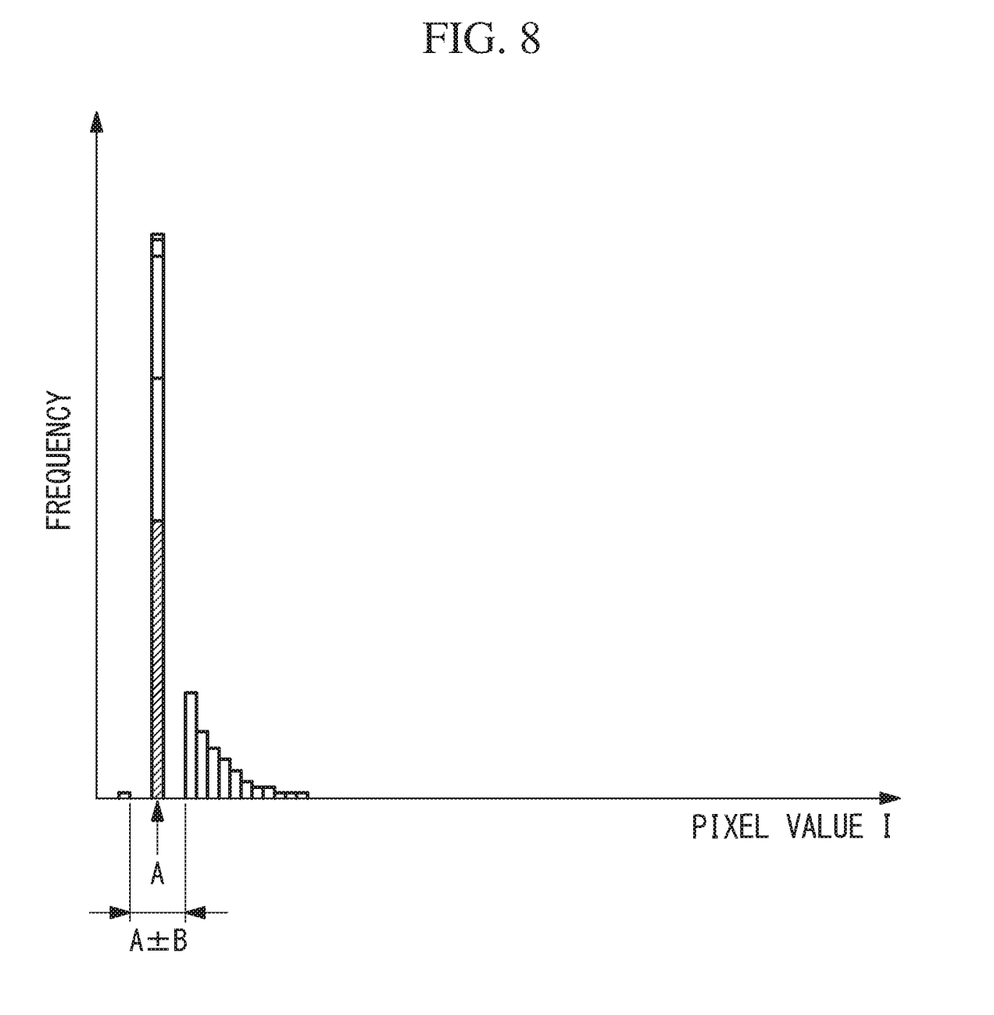
FIG. 8 is a schematic diagram showing a histogram in which the pixel values in a noise range that is determined with respect to the background pixel value in the histogram in FIG. 7 are replaced with the background pixel value.
Figure 9:
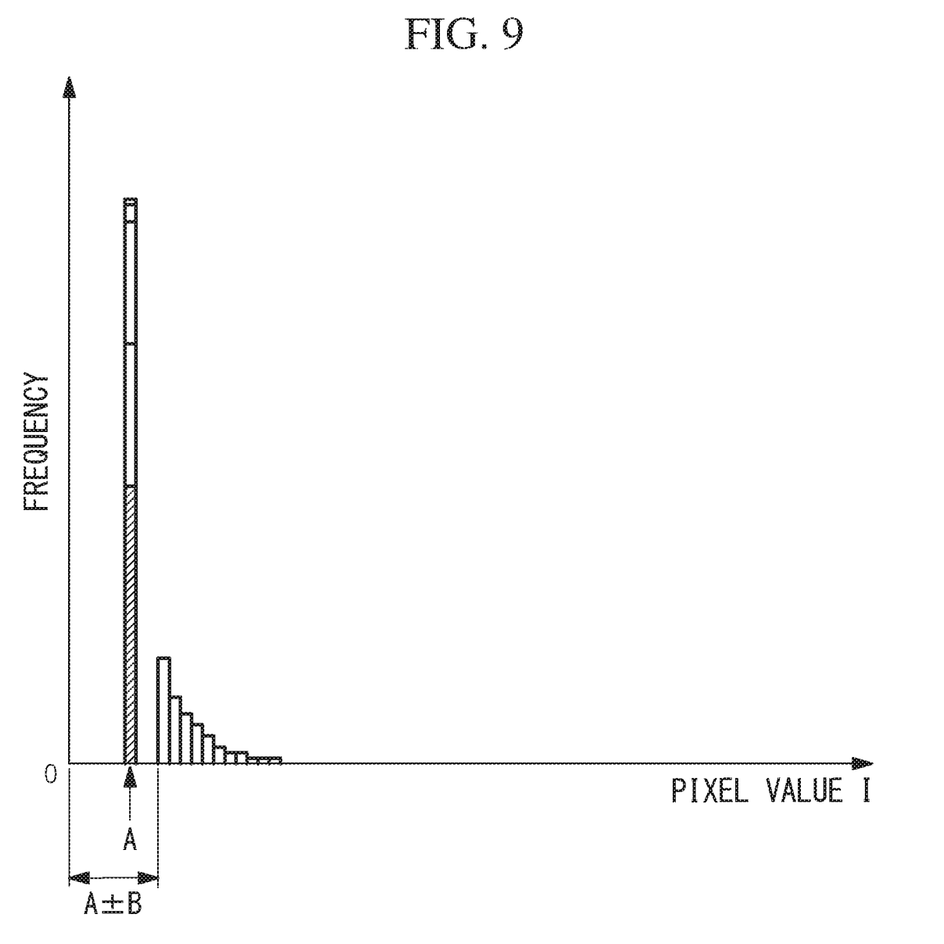
FIG. 9 is a schematic diagram showing a histogram in which the pixel values in a noise range that is determined with respect to the background pixel value in the histogram in FIG. 7 and that has a lower limit of zero are replaced with the background pixel value.

Unlike phase-contrast observation, in fluorescence observation, most background colors are black, in which case the histogram is as shown in FIG. 7. In this case, in the same manner as above, the pixel values I may be replaced as shown in FIG. 8. Alternatively, the lower limit of the noise range B may be set to zero, and the pixel values in the range from zero to A+B may be replaced with the background pixel value A, as shown in FIG. 9. By doing so, a clear output image can be obtained by eliminating even minute noise.

Although all the pixel values I in the noise range A±B, which has been determined with respect to the background pixel value A, are replaced with the background pixel value A in this embodiment, instead of this, the pixel values may be replaced with another pixel value I (a single arbitrary pixel value), such as zero, that is clearly different from the pixel values I of the observation object.

The image processing method according to this embodiment can be carried out not only by the image processing device 3 composed of circuits but also by an image processing program executable by a computer. In this case, the image processing device 3 includes: a processor, such as a CPU; a main storage device, such as a RAM; and a computer-readable, non-temporary storage medium in which the image processing program for realizing the entirety or a portion of the above-described processing is stored. The storage medium is, for example, a magnetic disk, a magneto-optical disk, a CD-ROM, a DVD-ROM, a semiconductor memory, or the like. The image processing programs are read out from the storage medium into the main storage device, and the processor executes information processing and arithmetic operations according to the image processing programs, thereby realizing the same processing as described above in the image processing device 3.

The above-described embodiment also leads to the following aspects.

One aspect of the present invention is an image processing device including: a pixel-value-histogram generation unit for generating a histogram of pixel values of a plurality of pixels contained in an image; a background-pixel-value setting unit for setting a background pixel value by using a peak value of the generated histogram; a noise-range setting unit for setting a noise range with respect to the set background pixel value; and a pixel-value replacement unit for replacing the pixel values that fall in the set noise range with a single arbitrary pixel value.

According to this aspect, the acquired image is input to the pixel-value-histogram generation unit, and a histogram of the pixel values of the plurality of pixels constituting the image is generated. As a result of the generated histogram being input to the background-pixel-value setting unit, a peak value is detected, and the detected peak value is set to the background pixel value. In addition, a noise range is set by the noise-range setting unit with respect to the background pixel value, and the pixel values that fall in the noise range are replaced with a single arbitrary pixel value in the pixel-value replacement unit.

More specifically, according to this aspect, in the case where an image in which observation objects are scattered throughout a background color region is to be processed, it is made clear that the background pixel value representing the background color of the image accounts the largest proportion in the image, thereby making it possible to easily identify pixels that can be replaced with the background color, i.e., pixels having pixel values distributing in the noise range, which has been determined with respect to the background pixel value. Also, it is possible to generate an image that can be compressed at a high rate by replacing, with the single arbitrary pixel value, the pixel values in the image in which observation objects are scattered throughout the background color region.

In this case, pixels that can be replaced with the background color are selected only on the ground that the pixels have pixel values falling in the noise range, which has been determined with respect to the background pixel value. Therefore, it is not necessary to determine whether or not the pixel of interest is a pixel belonging to an observation object, leading to dramatic reduction in processing time.

In the above-described aspect, the single arbitrary pixel value may be the background pixel value set by the background-pixel-value setting unit.

In addition, in the above-described aspect, the noise-range setting unit may set the noise range on the basis of noise statistics.

By doing so, the noise area with respect to the background pixel value can be easily set on the basis of noise statistics. The noise statistics may be set on the basis of, for example, the noise standard deviation of the camera if the camera used to acquire the image is known or may be obtained from the standard deviation of the luminance of the image without a specimen.

In the above-described aspect, the noise-range setting unit may set the noise range on the basis of a predetermined ratio with respect to a difference between a maximum value and a minimum value of the pixel values.

By doing so, the noise range can be set on the basis of the maximum value and the minimum value of the pixel values, as well as the predetermined ratio.

In the above-described aspect, at least two images may be input, and the background-pixel-value setting unit may set the background pixel value common to all the images.

By doing so, in the case where at least two images are compared and used, such as in the case of tiling, in which a high-resolution, wide-view image is generated by arranging at least two images that have been acquired with the field of view being shifted, or in the case of time-lapse observation, in which at least two images acquired at time intervals are time-sequentially observed, observation can be made easier by using common background brightness, contrast, etc. among the images.

In this case, methods for making the background pixel value common among at least two images may include a method for applying the background pixel value set in one image to all the other images and a method for employing the mean value or the median value of the background pixel values set in all the images. In addition, the background pixel value may be made common among the images either before or after the pixel values are replaced with the background pixel value in each image.

The above-described aspect may further include a shading correction unit for performing shading correction on the image, wherein the pixel-value-histogram generation unit may generate a histogram of the pixel values of the image that has been subjected to shading correction by the shading correction unit.

By doing so, shading correction is applied in the case where the luminance is not uniform depending on the characteristics of the optical system and the image acquisition system for acquiring the image. Also, the pixel values can be replaced with the background pixel value with high accuracy by generating a histogram after the background color has been uniformly corrected.

In the above-described aspect, the image may be an image obtained by acquiring an image of a biological sample.

In the above-described aspect, the image may be an image obtained by at least one of observation methods of bright field, dark field, phase difference, differential interference, fluorescence, and Hoffman modulation contrast.

By doing so, it is possible to quickly generate an image that can be compressed at a high rate by processing the image in which observation objects, such as biological samples, are scattered throughout the monochrome background. In applications, such as tiling and time-lapse observation, in which many images need to be stored, it is possible to significantly reduce the storage capacity by compressing each of the images at a high rate.

Another aspect of the present invention is a microscope system including: one of the above-described image processing devices.

Still another aspect of the present invention is an image processing method including: a pixel-value-histogram generation step for generating a histogram of pixel values of a plurality of pixels contained in an image; a background-pixel-value setting step for setting a background pixel value by using a peak value of the generated histogram; a noise-range setting step for setting a noise range with respect to the set background pixel value; and a pixel-value replacement step for replacing the pixel values that fall in the set noise range with a single arbitrary pixel value.

In the above-described aspect, the single arbitrary pixel value may be the background pixel value set in the background-pixel-value setting step.

The above-described aspect may further include: a shading correction step for performing shading correction on the image, wherein the pixel-value-histogram generation step may generate a histogram of the pixel values of the image that has been subjected to shading correction in the shading correction step.

Yet another aspect of the present invention is an image processing program for causing a computer to execute: a pixel-value-histogram generation step for generating a histogram of pixel values of a plurality of pixels contained in an image; a background-pixel-value setting step for setting a background pixel value by using a peak value of the generated histogram; a noise-range setting step for setting a noise range with respect to the set background pixel value; and a pixel-value replacement step for replacing the pixel values that fall in the set noise range with a single arbitrary pixel value.

In the above-described aspect, the single arbitrary pixel value may be the background pixel value set in the background-pixel-value setting step.

The above-described aspect may cause the computer to execute: a shading correction step for performing shading correction on the image before the pixel-value-histogram generation step.

REFERENCE SIGNS LIST

1 Microscope system
3 Image processing device
4 Pixel-value-histogram generation unit
5 Background-pixel-value setting unit
6 Noise-range setting unit
7 Pixel-value replacement unit
8 Shading correction unit
A Background pixel value
B, A±B, A±kσ Noise range
I Pixel value
IMAX Maximum value
IMIN Minimum value
S1 Pixel-value-histogram generation step
S2 Background-pixel-value setting step
S3 Noise-range setting step
S4 Pixel-value replacement step
S11 Shading correction step

The invention claimed is:

1. An image processing device comprising:
a processor configured to:
generate a histogram of pixel values of a plurality of pixels contained in an image;
set a background pixel value by using a peak value of the generated histogram;
set a noise range with respect to the set background pixel value; and
replace the pixel values that fall in the set noise range with a single arbitrary pixel value,
wherein the processor is configured to:
perform shading correction on the image; and
generate a histogram of the pixel values of the image that has been subjected to shading correction.

2. An image processing device comprising:
a processor configured to:
generate a histogram of pixel values of a plurality of pixels contained in an image;
set a background pixel value by using a peak value of the generated histogram;
set a noise range with respect to the set background pixel value; and
replace the pixel values that fall in the set noise range with a single arbitrary pixel value,
wherein the image is an image obtained by acquiring an image of a biological sample.

3. An image processing device comprising:
a processor configured to:
generate a histogram of pixel values of a plurality of pixels contained in an image;

set a background pixel value by using a peak value of the generated histogram;
set a noise range with respect to the set background pixel value; and
replace the pixel values that fall in the set noise range with a single arbitrary pixel value,
wherein the image is an image obtained by at least one of observation methods of bright field, dark field, phase difference, differential interference, fluorescence, and Hoffman modulation contrast.

4. A microscope system comprising:
an image processing device comprising:
  a processor configured to:
    generate a histogram of pixel values of a plurality of pixels contained in an image;
    set a background pixel value by using a peak value of the generated histogram;
    set a noise range with respect to the set background pixel value; and
    replace the pixel values that fall in the set noise range with a single arbitrary pixel value.

5. A non-transitory computer-readable medium having an image processing program stored therein, the program causing a computer to execute functions of:
generating a histogram of pixel values of a plurality of pixels contained in an image;
setting a background pixel value by using a peak value of the generated histogram;
setting a noise range with respect to the set background pixel value; and
replacing the pixel values that fall in the set noise range with a single arbitrary pixel value,
wherein the image is an image obtained by acquiring an image of a biological sample.

6. The non-transitory computer-readable medium according to claim 5,
wherein the single arbitrary pixel value is the set background pixel value.

7. The non-transitory computer-readable medium according claim 5,
wherein the noise range is set on the basis of a predetermined ratio with respect to a difference between a maximum value and a minimum value of the pixel values.

8. The non-transitory computer-readable medium according to claim 5,
wherein the program causes the computer to execute a function of performing shading correction on the image before generating the histogram of pixel values.

9. The image processing device according to claim 2,
wherein the single arbitrary pixel value is the set background pixel value.

10. The image processing device according to claim 2,
wherein the processor is configured to set the noise range on the basis of noise statistics.

11. The image processing device according claim 2,
wherein the processor is configured to set the noise range on the basis of a predetermined ratio with respect to a difference between a maximum value and a minimum value of the pixel values.

12. The image processing device according to claim 2,
wherein at least two images are input, and the processor is configured to set the background pixel value common to all the images.

13. The image processing device according to claim 2,
wherein the processor is configured to:
  perform shading correction on the image; and
  generate a histogram of the pixel values of the image that has been subjected to shading correction.

14. The image processing device according to claim 2,
wherein the image is an image obtained by at least one of observation methods of bright field, dark field, phase difference, differential interference, fluorescence, and Hoffman modulation contrast.

15. A microscope system comprising:
the image processing device according to claim 2.

16. An image processing method comprising:
generating a histogram of pixel values of a plurality of pixels contained in an image;
setting a background pixel value by using a peak value of the generated histogram;
setting a noise range with respect to the set background pixel value; and
replacing the pixel values that fall in the set noise range with a single arbitrary pixel value,
wherein the image is an image obtained by acquiring an image of a biological sample.

17. The image processing method according to claim 16,
wherein the image processing method comprises:
  performing shading correction on the image; and
  generating a histogram of the pixel values of the image that has been subjected to shading correction.

18. The image processing method according to claim 16,
wherein the image is an image obtained by at least one of observation methods of bright field, dark field, phase difference, differential interference, fluorescence, and Hoffman modulation contrast.

* * * * *